US008576852B2

(12) United States Patent
Arisoylu et al.

(10) Patent No.: US 8,576,852 B2
(45) Date of Patent: Nov. 5, 2013

(54) INTER-OFFICE COMMUNICATION METHODS AND DEVICES

(75) Inventors: Mustafa Arisoylu, San Diego, CA (US); H. Cahit Akin, San Diego, CA (US); Rene L. Cruz, San Diego, CA (US); Rajesh Mishra, San Diego, CA (US)

(73) Assignee: Mushroom Networks, Inc., San Diego, CA (US)

( * ) Notice: Subject to any disclaimer, the term of this patent is extended or adjusted under 35 U.S.C. 154(b) by 0 days.

(21) Appl. No.: 12/491,202

(22) Filed: Jun. 24, 2009

(65) Prior Publication Data

US 2009/0323554 A1 Dec. 31, 2009

Related U.S. Application Data

(60) Provisional application No. 61/075,092, filed on Jun. 24, 2008.

(51) Int. Cl.
*H04L 12/28* (2006.01)

(52) U.S. Cl.
USPC .............. 370/395.2; 370/395.21; 370/395.3; 370/437

(58) Field of Classification Search
None
See application file for complete search history.

(56) References Cited

U.S. PATENT DOCUMENTS

| | | | |
|---|---|---|---|
| 5,182,550 A | 1/1993 | Masuda et al. |
| 5,530,700 A | 6/1996 | Tran et al. |
| 6,253,247 B1 | 6/2001 | Datta et al. |
| 6,295,276 B1 | 9/2001 | Datta et al. |
| 6,490,295 B1 | 12/2002 | Cooklev et al. |
| 6,493,341 B1 | 12/2002 | Datta et al. |
| 6,775,235 B2 | 8/2004 | Datta et al. |
| 6,865,185 B1 | 3/2005 | Patel et al. |
| 6,910,149 B2 | 6/2005 | Perloff et al. |
| 6,948,003 B1 | 9/2005 | Newman et al. |
| 7,002,993 B1 | 2/2006 | Mohaban et al. |
| 7,269,143 B2 | 9/2007 | Datta et al. |
| 7,292,575 B2 | 11/2007 | Lemieux et al. |
| 7,315,554 B2 | 1/2008 | Baum et al. |
| 7,406,048 B2 | 7/2008 | Datta et al. |
| 7,444,506 B1 | 10/2008 | Datta et al. |
| 2004/0052257 A1 | 3/2004 | Abdo et al. |
| 2004/0117438 A1 | 6/2004 | Considine et al. |
| 2004/0236855 A1* | 11/2004 | Peles ............................ 709/227 |
| 2005/0132062 A1 | 6/2005 | Halme |
| 2006/0064492 A1 | 3/2006 | Hirsch |
| 2006/0084469 A1 | 4/2006 | Malone et al. |

(Continued)

OTHER PUBLICATIONS

International Search Report for /PCT/US09/48524.
International search report dated Dec. 10, 2009 for corresponding PCT application PCT/US09/48524.
Extended European Search Report issued in corresponding application EP 09798530.3 on Aug. 27, 2013, 7 pages.

(Continued)

*Primary Examiner* — Andrew Chriss
*Assistant Examiner* — Salvador E Rivas
(74) *Attorney, Agent, or Firm* — DLA Piper LLP

(57) ABSTRACT

The system provides a low cost way of providing high speed point to point communications between two offices, as well as Internet access, which exploits the use of low cost access technologies, such as ADSL, in such a way that (a) no CO component is required to deploy the solution, (b) the two offices could have different types of communication technologies available, and (c) more than two offices can form an overlay network, whereby each pair of offices has a virtual single high throughput pipe available which is achieved through aggregation of Internet access services at each office. The proposed system allows intranet communication links or Internet connections to be aggregated, thereby enabling faster and more reliable communications.

20 Claims, 4 Drawing Sheets

(56) References Cited

U.S. PATENT DOCUMENTS

| | | |
|---|---|---|
| 2006/0098573 A1 | 5/2006 | Beer et al. |
| 2006/0114897 A1* | 6/2006 | Suri .............................. 370/389 |
| 2006/0215593 A1 | 9/2006 | Wang et al. |
| 2007/0147244 A1 | 6/2007 | Rasanen |
| 2007/0192543 A1* | 8/2007 | Naik et al. .................... 711/133 |
| 2009/0316623 A1* | 12/2009 | Pettersson et al. ............ 370/328 |

OTHER PUBLICATIONS

Hara, Y. et al. "VPN Architecture Enabling Users to be Associated with Multiple VPNs", Denshi Jouhou Tsuushin Gakkai Gijutsu Kenkyuu Houkoku, Institute of Electronics, Information and Communication Engineers, Technical Report, Denshi Jouhou Tsuushin Gakkai, JP, vol. IN2003-50, Jul. 11, 2003, pp. 1-6.

* cited by examiner

# INTER-OFFICE COMMUNICATION METHODS AND DEVICES

This patent application claims priority to U.S. Provisional patent application No. 61/075,092 filed on Jun. 24, 2008, incorporated by reference herein in its entirety.

FIELD

The system is directed to the field of network communications, including Internet and intranet communications.

BACKGROUND OF THE SYSTEM

In order to facilitate communications between a main office and a branch office, or between two locations in general, businesses may use a so-called leased line between the offices. A telephone company or other telecommunications carrier usually provides the leased line, commonly a T1 line which provides the connectivity between the offices. Typically this is realized by a separate T1 line from each office to the phone company's Central Office (CO), and the CO provides a switching function to provide the connectivity between the offices.

The data communications between the offices will often use the IP protocol. If a T1 line is used, this provides a communication channel with a bit rate of approximately 1.54 Mbits/second in each direction. Sometimes in order to support higher bit rates, two or more T1 lines can be bonded together to create a single higher speed communication channel. This is done between each office and the CO, and requires special terminating equipment at each end, as well as at the CO.

Many types of Internet access technologies that are commonly available are asymmetric, in the sense that one path (e.g. the uplink) speed is slower than the other path (e.g. downlink) speed. Thus, even though the downlink speed of an Internet access line may be fast enough to support interoffice communications, the rate of the uplink may be too slow. One prior art attempt at a solution is to bond or aggregate together many such channels, e.g. ADSL or DSL lines. However, this involves installing special equipment at both ends of the link to achieve the bonding, i.e. at the subscriber end and at the CO end.

In some situations one office, the main office, will have Internet access. The other office, the branch office, may obtain its Internet access through the leased line. This limits the speed of Internet access for the branch office to the speed of the leased line between the offices, and in many cases may be inadequate compared with locally provided asymmetric access technologies that provide much faster download speeds.

In other situations, the main office and the branch office may have different types of communication channels available. For example, at one office perhaps DSL is available at higher speed relative to the another office. Perhaps in one office a cable modem service is available, but it is not available at the other office. In such situations, it is still desirable to provide a high speed and reliable communication channel between the offices.

In some situations, the main office may be in communication with more than one branch office. In this case, it is desired to use the same communication facilities at the main office to communicate with each branch office, in order to save costs.

When access lines are bonded using methods in the prior art, typically there is a requirement that all of the access lines are purchased through the same telecommunications carrier, and even that the access lines that are being bonded be terminated in same line card in the CO. This reduces reliability for the end user. If a user were able to use multiple telecommunications carriers, the diversity that results could increase the reliability of the system.

If the requirement for a component at the CO could be removed, this would enable both Competitive Local Exchange Carriers (CLECs) as well as enterprises to deploy the solution without cooperation from the telecommunications carrier.

SUMMARY OF THE SYSTEM

The system provides a low cost way of providing high speed point to point communications between two offices, as well as Internet access, which exploits the use of low cost access technologies, such as ADSL, in such a way that (a) no CO component is required to deploy the solution, (b) the two offices could have different types of communication technologies available, and (c) more than two offices can form an overlay network, whereby each pair of offices has a virtual single high throughput pipe available which is achieved through aggregation of Internet access services at each office. The proposed system allows intranet communication links or Internet connections to be aggregated, thereby enabling faster and more reliable communications for applications such as intranet inter-office communications and Internet communications.

Each office in the system has one or more Internet access lines to a communications carrier. Two offices may communicate directly with each other by establishing a communication channel between each distinct pair of access lines, where each pair of access lines is such that one access line is at one office and the other access line is at the other office, using the IP protocol (or other packet forwarding protocol) to forward the information from an aggregation device in one office to another aggregation device in the other office, and spreading the traffic over all such channels. No component is required in the carrier network since the bonding is done above the link layer. File downloads at each office can also be accelerated using the aggregation device by making use of multiple Internet access lines to concurrently download different segments of a file over distinct Internet access lines. File uploads at an office can be accelerated by forwarding traffic over the plurality of communication channels to the remote aggregation device, where the stream at the source is reproduced at the remote aggregation device before forwarding the packets from the packet stream to the ultimate destination of the upload. A network of offices may be formed, whereby at each office there is an aggregation device that forwards all communications with a remote office to the associated remote aggregation device over the plurality of communication channels as above. Moreover, in the scenario where an Incumbent Local Exchange Carrier (ILEC) provides this service in such a way that no component is needed at the CO, then the ILEC can use the system to substantially reduce the cost of offering the service.

DETAILED DESCRIPTION

Figure 1:
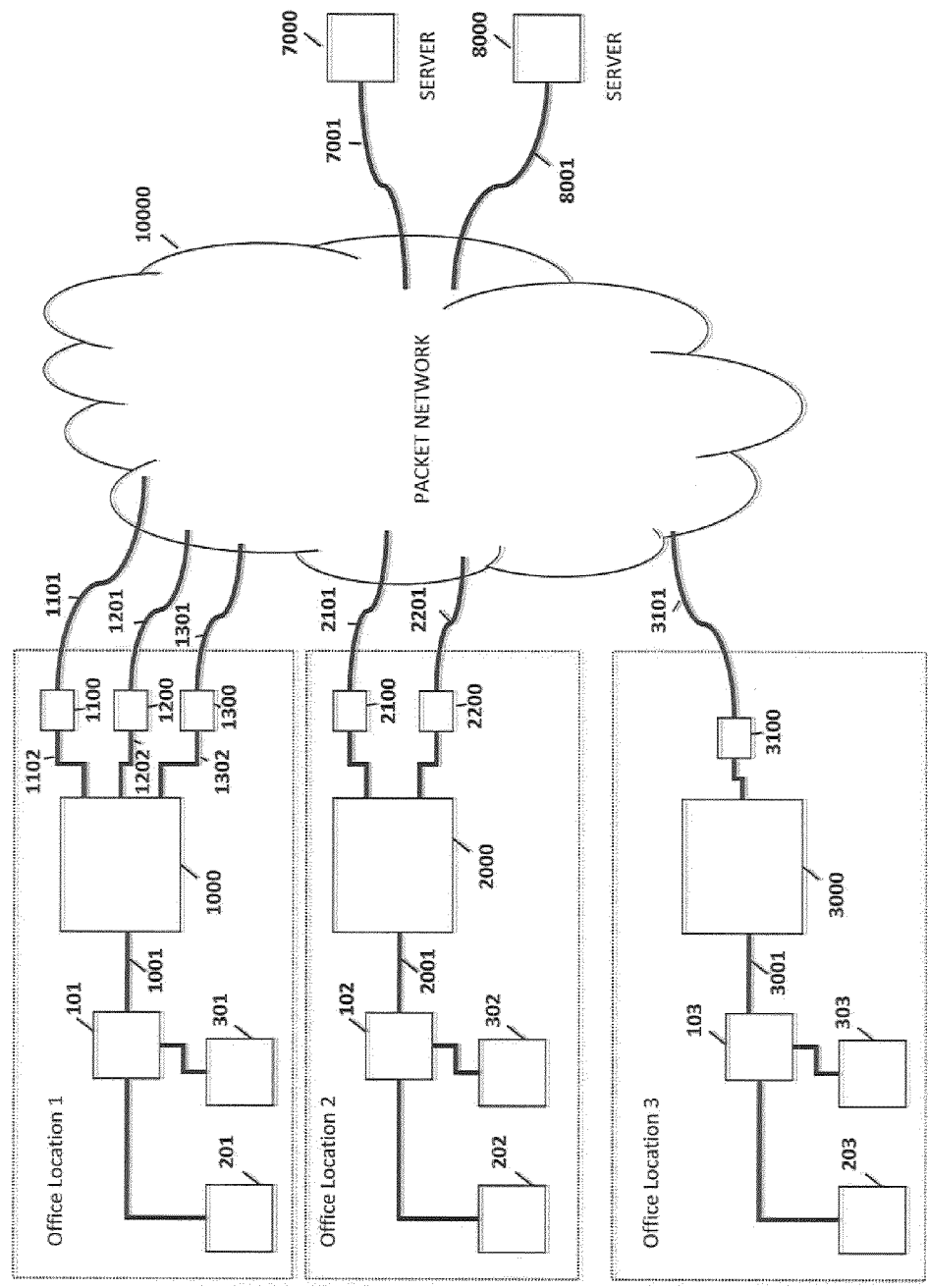
FIG. 1 is an illustration of an example inter-office data network in accordance with the disclosed system.

FIG. 1 depicts an example of an inter office communication system in accordance with the system. In this example there are three office locations but this is by way of example only. The system is not limited to three offices but could be implemented in two offices or in more than three offices without departing from the scope or spirit of the system. In each office location there are one or more computers or devices that in general will want to communicate with computers or devices in other office locations. Some of the devices in the office location may be routers, switches, or other types of networking equipment.

In the example depicted in FIG. 1, there are two devices 201 and 301 in the first location that are endpoints in the sense of generating or sinking data. They could represent personal computers, laptops, PDAs, etc. Similarly, devices 202 and 302 are endpoint devices in the second office location and devices 203 and 303 are devices in the third office location. In this example there are two endpoint devices at each office location, but in general there may some other number of such endpoint devices in each office location. In the first office location there is a router or switch device 101 whose function is to facilitate networking. Similarly, the device 102 is a router or switch in the second office location, and the device 103 is a router or switch in the third office location. In one embodiment, the endpoint devices use the IP protocol to communicate with each other. In this case the devices 101,102,103 may represent IP routers. In another embodiment the endpoint devices use a layer 2 protocol to communicate, such as Ethernet. In this case the devices 101,102, and 103 may represent layer 2 switches.

In any case, the endpoints devices will in general generate data packets for delivery to other endpoint devices, either in the same office location or a different office location, and the networking devices 101, 102, and 103 facilitate the delivery of such packets to the appropriate endpoint device.

The endpoint devices may in general wish to communicate with other devices which are not in any office location, but at arbitrary locations in a data network 10000. The data network 10000 may represent the Internet, for example. The data network 10000 may also represent a private IP network, or private layer 2 switched network. In the example shown in FIG. 1, there are two devices 7000 and 8000 which are not in any of the office locations. The devices 7000 and 8000 could represent web servers or other server devices. In general, the endpoint devices in each of the office locations may require communication with such external devices 7000 and 8000.

In order to facilitate communication, the devices 7000 and 8000 have access lines 7001 and 8001 that are used to communicate with other devices. Each office location has one or more access lines to the data network 10000. For example, if the data network 10000 is the Internet, the access lines could represent DSL connections, cable modem connections, T1 connections, DS3 connections, wireless connections, etc. The first office location has three such access lines 1101, 1201, 1301. Each access line is connected to a modem/route device, for example devices 1100, 1200, 1300 in FIG. 1. For example, if access line 1101 is a DSL line, then the device 1100 could represent a DSL modem/router. Similarly, the device 1100 could represent a cable modem device or T1-line termination device.

Access Line Aggregation

In conventional approaches to providing inter-office communications, a single access line is used at an office location for all endpoint devices contained therein. The present system achieves a higher performance and reliability than conventional approaches by allowing each office location to have multiple access lines into a data network 10000, such as the Internet. In FIG. 1, the first office location has 3 access lines 1101, 1201, 1301, the second office location has two access lines 2101, 2201, (coupled to modem/route devices 2100 and 2200 respectively) and the third office location has only one access line 3101.

For example, the single access line of the third office location may have high capacity and reliability, which alleviates the need for additional access lines. The first and second office locations may only have access to certain types of access lines, such as DSL or cable, which will in general have different performance and reliability attributes associated with them. For example, one office location may be farther away from the telephone company offices than another, and hence the DSL lines at one office location may have a higher transmission capacity than the other. The present system allows a different number and different type of access lines at each office location. Moreover, the access lines at each location could have varying capacity. In the case of DSL lines, this could be because of crosstalk interference which varies with time.

Another example is where the access lines are wireless, such as provided by a wireless data carrier. Indeed, one of the office locations could be at a remote location where there are no wired access services available, and indeed an office location may be a mobile location, e.g. vehicle based.

The present system allows multiple paths to be used concurrently, increasing the available throughput and reliability of communication between endpoint devices in different office locations, or between an endpoint device inside an office location and an external device. This is achieved by the use of aggregation devices 1000, 2000, and 3000 in FIG. 1. The first office location uses the aggregation device 1000, the second office location uses the aggregation device 2000, and the third office location uses the aggregation device 3000.

In one embodiment, each aggregation device has a processor for receiving and delivery of packets to a local client through a local interface. Each aggregation device has WAN interfaces for each of the access lines. For example, the aggregation device 1000 has WAN interfaces 1102, 1202, 1302 which are used to communicate with the modem/router associated with each access line. The processor of an aggregation device includes memory resources for storing packets and maintaining state. Each local interface may have an associated network driver module.

In an embodiment of the system, the aggregation devices 1000, 2000, 3000 provide multiple paths of communication in or out of an office location, thereby increasing data throughput and reliability.

There are many possible embodiments of the aggregation devices. In the example illustrated in FIG. 1, for example, it may be possible to embed the functionality of an aggregation device 1000 within a router or switch 101. As another example, an aggregation device 1000 could be integrated with access devices 1100, 1200, and 1300 into a single hardware device.

Advantages of System

One aspect of the system is to exploit cost effective access line technologies at each of the office locations. For example, the price of a T1 carrier, which has a capacity of 154 Mbits/sec, may be in the range of $300 per month. On the other hand, it may be possible to combine four or five DSL lines to get obtain a service substantially faster than the T1 carrier at a cost substantially less than $300 per month.

Unlink link bonding approaches, which require a component at each end of the access link, the present system effectively bonds resources at a higher level. This eliminates the need for a component on the service provider side of the access link, and hence eliminates the need to cooperate with a telecommunications carrier in order to deploy the present system. As a result, with the present system, multiple access line services can be combined without cooperation with the entities that provide the access lines. Moreover, access lines from distinct communication carrier companies can be combined and aggregated with the present system. This can provide high reliability than otherwise possible, since simultaneous failures across different carriers are unlikely.

Figure 4:
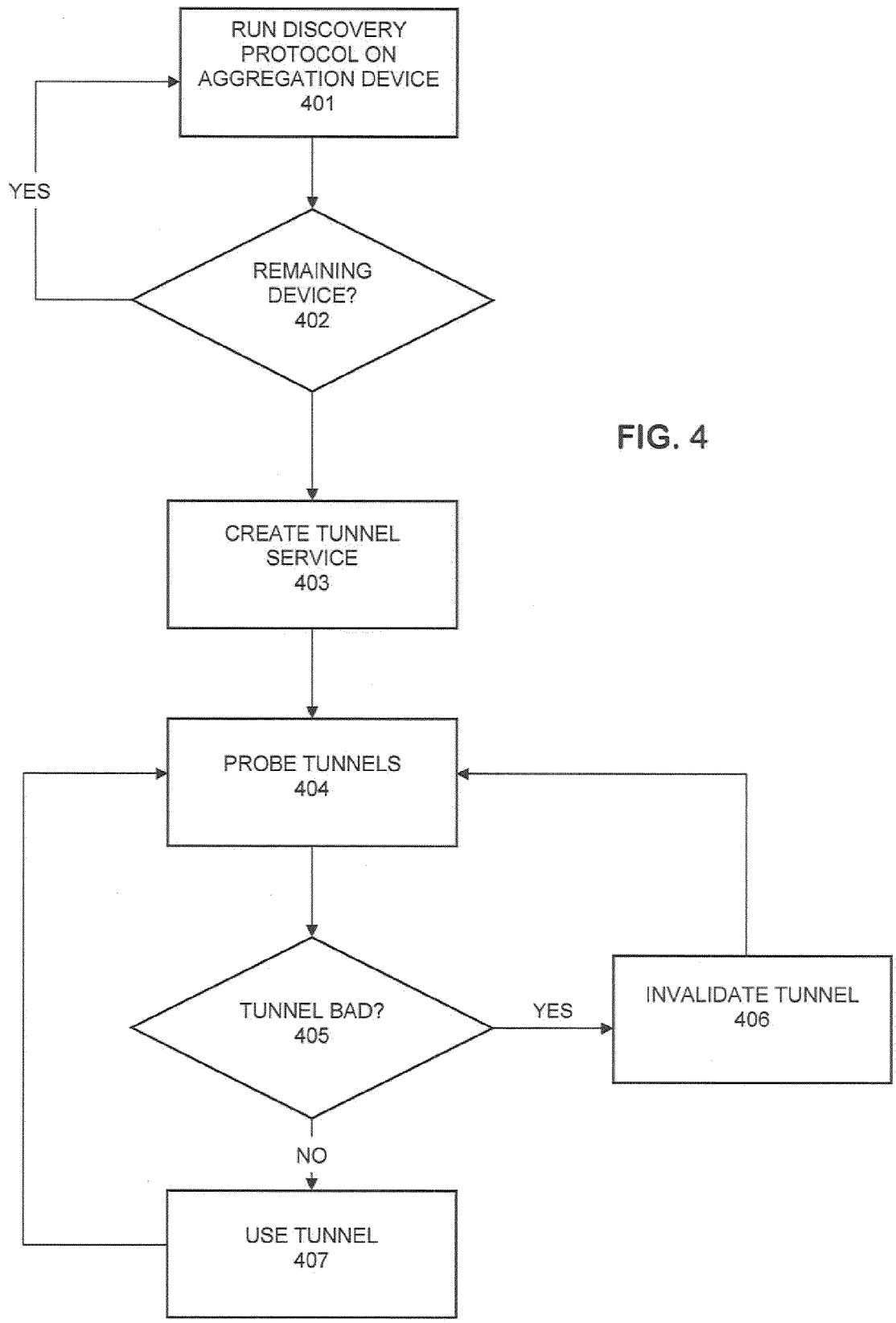
FIG. 4 is a flow diagram illustrating an embodiment of the system.

Initially, the system executes a discovery protocol to learn of the resources available to the system. The system next defines tunnel services between the aggregation devices. Then the system is ready to perform packet processing using the aggregation devices. FIG. 4 is a flow diagram illustrating the initialization of the system. At step 401 the system executes a discovery protocol which informs each aggregation device of the existence of other aggregation devices in the system with which it can cooperate. This protocol could take many forms, including a manual entry by a human operator in a database associated with each aggregation device. Automated modes of discovery are also possible. Such modes may involve the direct communication between aggregation devices, and such direct communication can be done using commonly known protocols in the data network 10000. For example, if the data network 10000 is an IP network such as the Internet, then the IP protocol can be used to communicate.

Associated with each aggregation device are parameters such as a set of addresses or identifiers that can be used in order to classify traffic, which is also learned by each aggregation device as part of the discovery protocol of step 401. For example, if the data network is an IP network, this could be a block of IP addresses represented by a network prefix or subnet address. If the data network is a layer 2 network, this could be a set of VLAN tag values. Other parameters associated with an aggregation device might include the set of IP addresses through which a given aggregation device can use to communicate with the associated aggregation device.

At decision block 402 it is determined if there are more aggregation devices to run the discovery protocol. If so, the system returns to step 401. If not, the system proceeds to step 403 and establishes a "tunnel service" for each pair of aggregation devices.

For a given pair of aggregation devices, a tunnel service is configured as follows. If the first aggregation device is attached to M access line devices, and the second aggregation device is attached to N access line devices, then there are MN paths between the aggregation devices, each of which is distinguished by which access line is used at each aggregation device. Given the access line used at each access line, the associated path between the access lines is determined by a routing or forwarding algorithm in the data network 10000.

For a given tunnel service between two aggregation devices, the aggregation devices can direct packets to flow over any one of the MN paths by appropriately addressing the packets and sending them through the network.

In one embodiment, at step 404, each aggregation device continually probes the status of each of the MN paths between them to evaluate their ability to carry traffic. At step 405 it is determined if the tunnel is usable. If not, it is invalidated at step 406. If it is usable, it is validated at step 407 and is available for use.

The tunnel service in one embodiment is unidirectional and has the following functionality. Data packets offered to the tunnel service at one of the aggregation devices, called the source of the tunnel, are replicated at the other aggregation device, called the sink of the tunnel, and exit the aggregation device there through the local port. For example for the tunnel service between the aggregation device 1000 and 2000, packets offered to the tunnel service at the source aggregation device 1000 are delivered to the port 2001 on the sink aggregation device 2000. Another tunnel between devices 1000 and 2000 in the opposite direction will in general also be present, but in this example we focus on this tunnel where device 1000 is the source.

Different modes of operation for the tunnel are possible. For example, suppose the performance objective is to maximize the aggregate transmission capacity, or throughput, subject to the constraint of the virtual link serving packets in First-In First-Out (FIFO) order. If the latency suffered by packets on a communication link is variable, then packets may arrive at one endpoint out of order. Thus, a reordering buffer at the remote endpoint is necessary to store packets that arrive out of order until they can leave the virtual link and be delivered in order to the client at the remote endpoint. As the load on the communication links increases, the variability of latency may increase, thereby increasing the delay required to reorder packets at the remote endpoint, and hence increasing the end-to-end latency of the virtual link. Thus there is a tradeoff between maximum throughput of the virtual link and the maximum latency of the virtual link. In one embodiment, packets are allowed to be delivered to the sink of the tunnel in a different order in which they were offered to the tunnel, but packets belonging to the same flow must be delivered to the sink of the tunnel in the same order that they were offered to the tunnel. In another embodiment, all the packets that are offered to the tunnel are delivered to the sink in the same order in which they were offered.

Flow Tables

In one embodiment of the system, flow tables are used to aid in operation. Packets can be classified into groups called flows. A flow is a set of packets whose header and/or payload information matches a given pattern. For example, in IP networks, a common definition of a flow is the set of all packets sharing a common source IP address, destination IP address, source port value, destination port value, and protocol number, sometimes called the 5-tuple. Packets from the same flow are often treated as a group, so it is useful to implement a database at each aggregation device, called a flow table, that carries information or state about each flow that the aggregation device has carried. In one embodiment, this information includes the actual bit pattern in the definition of the flow, which is called the flow ID. This information may also include a time stamp value indicating the last time a packet from this flow was sent or received. Other information about the flow may also be included as well.

Since the number of possible flows that could be seen by an aggregation device is large, it may be impractical to dedicate storage space for every possible flow that could be seen. To address this issue, in one embodiment, the flow table is implemented by using a hash table as follows. Each entry in the flow table is a linked list. In turn, each entry of the linked list is a pointer to information about a packet flow. Null pointers are used to denote empty lists, and the end of a list.

In such an embodiment, the flow table is populated as well as accessed via a hash function. The hash function is a mapping between the relevant bits of a packet header or payload that define a flow and entries of the hash table. For example, if the IP protocol is used for packet transport, the hash function maps values of the 5-tuple to an entry in the flow table. Under some operating conditions, the size of the flow table, i.e. the number of linked lists, is such that the average number of entries in the linked list is relatively small. When the number of entries in a list is greater than one, a "collision" is said to occur. This would happen if two or more flows happen to have the same hash value. When a collision occurs, the appropriate record for a flow can be found by sequentially searching through all of the records contained in the linked list for that flow table entry. In any case, the flow table provides a means to store and access information about each flow.

Aggregation Device Packet Processing

We now describe the actions taken by each aggregation device. In this discussion, we describe the actions relative to the aggregation device 1000 in FIG. 1. Each aggregation device 1000, 2000, and 3000 has a local port 1001, 2001, and 3001 respectively from which it receives packets locally and to which it sends packets locally.

We now consider the actions of an aggregation device when it receives a packet from a local port. For example the aggregation device 1000 may receive a packet from the local port 1001. When using the system, packets are reformatted to take advantage of the system. Specifically, there is an network address translation (NAT) step to change the network addresses to the endpoints of the tunnel service. Note that Network Address Translation (NAT) is used for local devices on all WAN interfaces, although an interface may also be configured in a pass-through mode in which case no translation is required. Traffic leaving an interface will have its source IP address set to the IP address of the corresponding interface.

In one embodiment, for each tunnel, there is an associated "client" aggregation device, and a "server" aggregation device. Traffic is forwarded along the tunnel from the client aggregation device to the server aggregation device and vice versa, i.e. it is a bi-directional data tunnel for IP packets.

Associated with each tunnel there may be a client IP subnet, and a server IP subnet. In one mode of operation, packets seen by the client aggregation device that are destined for the server subnet are forwarded along the tunnel to the server aggregation device. In a "Capture-All" mode of operation for the tunnel, however, any packet seen by the client aggregation device that is not destined for the client subnet is forwarded along the tunnel to the server aggregation device. In either the normal mode of operation or the Capture-All mode, packets seen by the server aggregation device that are destined to the client subnet are forwarded along the tunnel to the client aggregation device. Unless the Capture-All mode is used, there is no essential reason that one aggregation device should be selected as a client for the tunnel versus the server for the tunnel.

Receiving a Packet on the Local Interface

Figure 2:
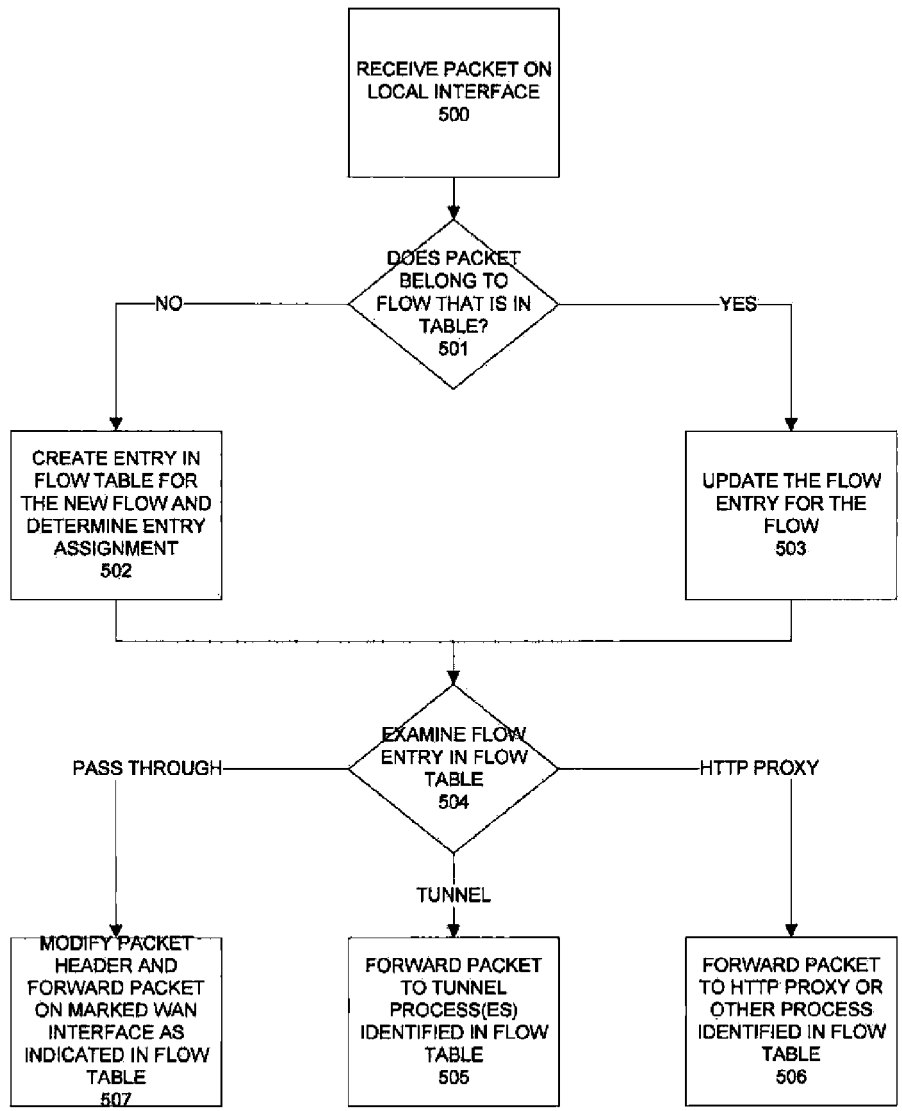
FIG. 2 is a flowchart describing the actions taken by an aggregation device when a packet is received from the local interface.

FIG. 2 is a flow diagram illustrating the operation of the system in receiving a packet on a local interface. At step 500 a packet is received on the local interface by an aggregation device. Moving to decision block 501, we first determine if there is a record for the flow to which the packet belongs. To do this we can compute the hash value associated with the flow ID of the packet, which corresponds to a single position in the flow table. If the packet belongs to a flow, the flow entry is updated at step 503.

If the associated linked list for flow table entry is empty, that implies there is no record of the flow in the flow table. In this case we move to processing block 502, where we create a new record for the flow. This is done by appropriately updating the linked list from a null list to a list containing a single element. The information for the flow is appropriately initialized. For example, the flow ID for the entry is recorded, and a time stamp value containing the current time can be recorded for the flow.

The information for each flow can include a binary flag for each tunnel service that originates at the aggregation device. The value of the binary flag will indicate whether or not packets from the given flow should be offered to the corresponding tunnel service.

In some cases, for example if the data network 10000 is layer 2 network, a flow may be offered to more than one tunnel service, which is a form of multicast. In other cases, a flow will not be assigned to any of the tunnel services that originate at the aggregation device.

When a flow is not assigned to any of the tunnel services, it may instead be associated with a special software process that is used to receive packets from that flow. One embodiment is where the process is an HTTP proxy service. The purpose of the HTTP proxy service is to utilize a plurality of WAN interfaces to fulfill HTTP requests instead of a single WAN interface. For example, if the packet flow corresponds to an HTTP request for a data object, the HTTP proxy can terminate the request by generating two or more HTTP requests for different segments of the object and sending such requests over multiple WAN interfaces. When the requests for the different segments are served, the HTTP proxy reformats the responses and serves the original request. By virtue of multiple WAN interfaces being used, the data object may be served faster than if only one WAN interface were used to transfer the object. Such an HTTP proxy server can be implemented by the server described in Patent Cooperation Treaty application number PCT/US2008/001893 entitled "Access Line Bonding and Splitting Methods and Apparatus" which is incorporated by reference herein in its entirety. In order to support such an embodiment, the information stored for a flow contains a binary flag, indicating whether or not the flow has been assigned to an HTTP proxy. A pointer to the appropriate HTTP proxy software process in case of assignment may also be included. In some embodiments, separate instances of HTTP proxy service processes are used for separate flows.

In some cases, flows may not be assigned to any tunnel service, and not be assigned to an HTTP proxy service either. In such cases, the flows may be handled by assigning them to a single WAN interface. Such assignments could be done on a round robin basis among all the WAN interfaces, or on a weighted round robin basis. Once an assignment to a WAN interface is made, the assignment is recorded in the information for the flow stored in the flow table. This is needed so that all packets from the flow that arrive later can be forwarded through the same WAN interface.

In any case, within the process block 502, it is determined to which tunnels the flow should be forwarded to, if any. This can be done using the data from the results of the discovery protocol that obtains all the information about all other aggregation devices in the network for which it should create tunnels for. If there are no tunnels for which the flow should be forwarded, then it is determined if the flow should be assigned to an HTTP proxy service. This can be done by appropriately examining the contents of the packet. In some cases, a flow may not be initially assigned to an HTTP proxy service, but may be assigned later to an HTTP proxy service. In cases, where the flow is not assigned to any tunnel, nor to any HTTP proxy, it is assigned to a fixed WAN interface using an assignment algorithm as discussed above, and the results of the assignment are stored in the entry for the flow. The results of all this processing are stored in the entry for the flow in the flow table.

Consequently, after leaving block 502 and entering the decision block 504, a determination can be made whether to enter processing block 505, 506, or 507, which respectively forward the packet to one or more tunnels, forward the packet to an HTTP proxy service, or forward the packet to an assigned WAN interface. These decision outcomes out of block 504 are labeled "tunnel," "HTTP proxy," and "Pass through," respectively. In the last case, in process block 507, before the packet is forwarded on the assigned interface, the source address of the packet is replaced by the address of the WAN interface. This is generally done because the address of the WAN interface is a public, externally reachable IP address, whereas the source address of the packet may be a local IP address which is not externally meaningful.

Receiving a Packet on a WAN Interface

Figure 3:
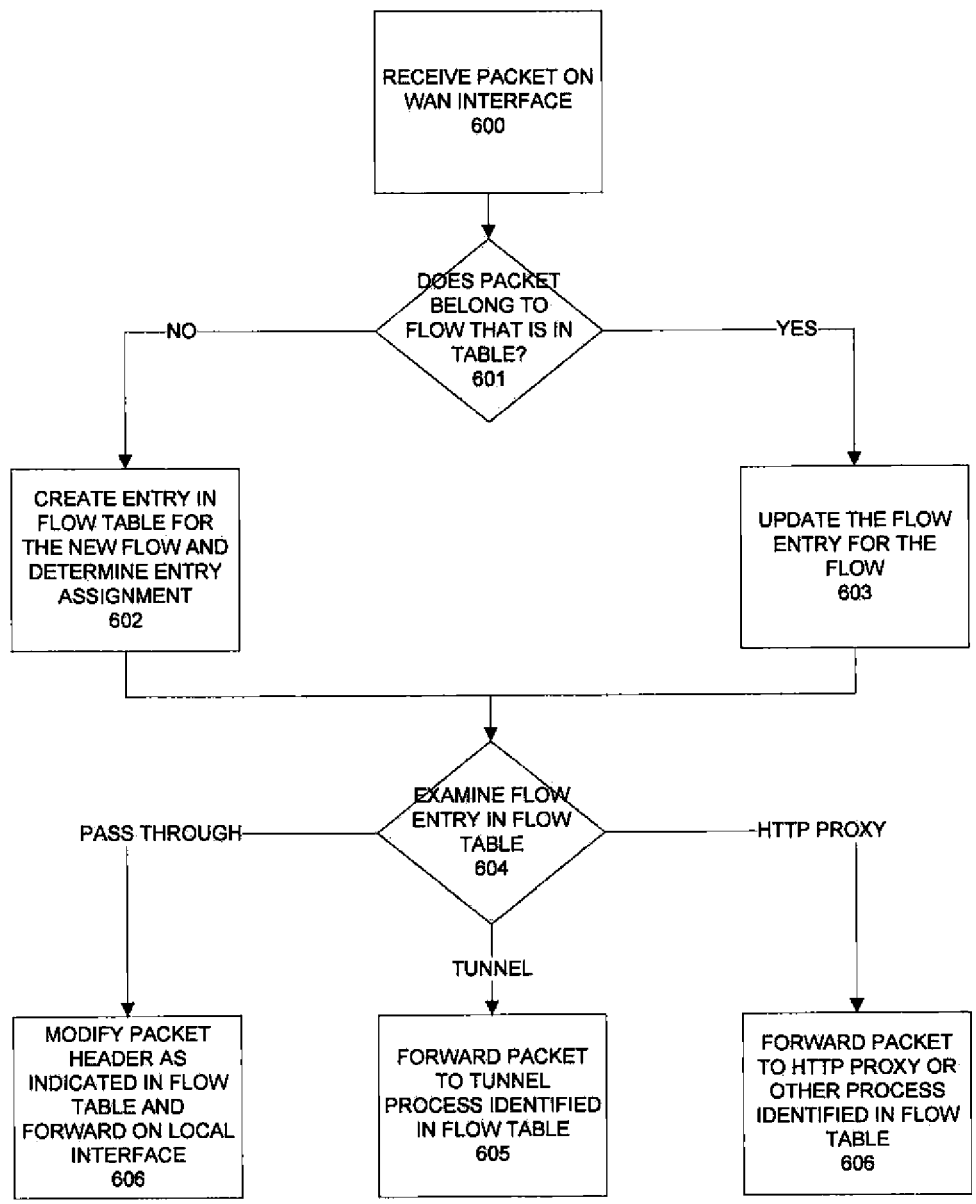
FIG. 3 is a flowchart describing the actions taken by an aggregation device when a packet is received from a WAN interface.

FIG. 3 is a flow diagram illustrating the processing of packets received by an aggregation device on a WAN interface. At step 600, a packet is received on the WAN interface. Using the procedure described in connection with FIG. 2, first it is determined whether or not the packet belongs to a flow for which there is a record of in the flow table at decision block 601. If there is no such record, the processing moves to block 602, where a new entry for the flow is created. The aggregation device first determines if the packet belongs to a flow that is associated with a tunnel service. Such flows may comprise the packets sent on a particular path between the source and sink devices for a particular tunnel service. There is a binary flag associated with each tunnel service that terminates at the aggregation device, which indicates whether or not packets from the flow should be forwarded to the corresponding tunnel service that terminates at the aggregation device. If the flow does not contain packets destined for a tunnel process, it is determined if the flow is associated with a packet flow in the opposite direction that has been assigned to the associated WAN interface over which the packet arrived, or if the flow is associated with a packet flow in the opposite direction that was initiated by an HTTP proxy service process. After leaving block 602, we move to the decision block 604 where we can therefore determine whether to "tunnel," i.e. forward the packet to a tunnel process(es) as specified in block 605, as indicated by the binary flags associated with the flow as described above for each tunnel service that terminates at the aggregation device. If it is determined in block 604 that the flow is associated with a packet flow in the opposite direction that has been assigned to the WAN interface over which the packet arrived, then the processing moves to block 606, where the destination address field is replaced by the original source address that was over-written in the source address field of packets belonging to the flow in the opposite direction. This is the "Pass through" outcome of the decision block 604. Finally, the "HTTP proxy" outcome of the decision block 604 corresponds to the scenario where the packet belongs to a flow associated with an HTTP proxy service processes, and in this case the packet is forwarded to the appropriate software process in block 607.

If in decision block 601, if it is determined that the packet received on a WAN interface does belong to a flow for which there is a record of, then the processing moves to block 603, where the entry for the flow is updated. The updating in processing block 603 could include writing the value of the current time in a time stamp field. After leaving block 603, the processing moves to decision 604, where the same logic is applied as before, when moving from block 602.

It should be noted that an HTTP proxy software process may also modify the flow table, and this is the manner in which from decision block 604, we could next move to processing block 607.

Capture All Mode

One application of the "Capture All" mode is to provide faster internet connectivity to one office by using the capabilities of another office. Consider the situation where one of the offices has a relatively fast Internet connection but the others do not. For example, in FIG. 1, suppose office location 3 has a relatively fast Internet connection through the modem 3100. If another office location, say office location 1, has relatively slow Internet access, then the devices in office location 1 can use the faster Internet connection in office location 3 when a tunnel service is set up between office location 1 and office location 3. Suppose the aggregation device 1000 is configured as the client and device 3000 is configured as the server for the tunnel, and the tunnel is configured in the Capture All mode. Accordingly, when any device within office location 1 generates traffic for a device external to office location 1, the traffic will first be sent to the destination of the data tunnel, which is aggregation device 3000. Such traffic is then handled by the aggregation device 3000 as if the traffic had been generated locally, within office location 3. Since the office location 3 has a fast connection to any server in the Internet, this effectively provides all devices within office location 1 a fast connection to the Internet.

It is also possible to have multiple data tunnels defined within a single aggregation device. In the previous scenario, for example, in addition to the data tunnel configured between device 1000 and device 3000, there could be a second data tunnel defined, originating at the aggregation device 2000 and terminating at the aggregation device 3000, where device 2000 is defined as the client and device 3000 is defined as the server of this second data tunnel, and the second tunnel is also configured in Capture All mode. In this way, both the offices at location 1 and location 2 can use the fast connection to the Internet of office location 1. Using this idea, more complex office networks with more than two offices can be formed.

Note that by using the Capture All mode of operation, any external traffic generated at the client side of the tunnel is transported to the server side of the tunnel before being transported further, in order to take advantage of a faster possible end-to-end data transfer speed. Using the methods of an earlier disclosure, described in Patent Cooperation Treaty application number PCT/US2008/001893 entitled "Access Line Bonding and Splitting Methods and Apparatus" which is incorporated by reference herein in its entirety. It is also possible to speed up data object downloads with a single aggregation device. It is therefore possible to combine these approaches, so that a subset of traffic is handled by the HTTP proxy server, and the remaining traffic is forwarded through a data tunnel. In this way, it is sometimes possible to obtain faster data transfers without the use of an additional aggregation device. For example, in the scenario discussed above, a subset of the traffic generated at office location 1 can be handled by a HTTP proxy server within the aggregation device 1000 in office location 1, rather than being forwarded the aggregation device in office location 3. In this way, selected data transfers can be accelerated without creating additional traffic load at office location 3.

Thus, using the current system, multiple offices may utilize multiple redundant Internet access links to create an overlay network with high speed and high reliability, using the disclosed aggregation devices at each office, and without requiring special equipment at the ISP or provider premises. File downloads over HTTP can be accelerated over multiple WAN interfaces with an HTTP proxy, while at the same time other traffic can be tunneled to a remote network, or be assigned to exactly one WAN interface. Such a configured system enjoys greater speeds and greater reliability than otherwise possible.

Failure Recovery

In some cases, there may be a failure on a tunnel that has been established between devices. The system is such that handling of the flow can default from one handling to another. If a tunnel goes down, the aggregation devices can go into a backup mode where they treat traffic as normal IP packets instead of the disclosed technique. Instead of routing packets through the tunnel, they can just be routed in the normal way using the IP forwarding mechanism.

What is claimed is:

1. A method of communicating between a first office and a second office comprising:
    identifying M access lines coupled at the first office; identifying the N access lines at the second office;
    configuring, via a first aggregation device at the first office and a second aggregation device at the second office, a tunnel service of access links between the first and second devices wherein the tunnel service of access links is comprised of MN concurrent paths and is configured to:
    create multiple redundant access links between the first office and the second office;
    bond communication resources over an access link at a level higher than the link layer such that terminating components at both sides of the access link are not required; and
    utilize, when the second office has a faster Internet connection than the first office, a capture all mode of communication between the first aggregation device configured as a client and the second aggregation device configured as a server, wherein the capture all mode routes/delivers all traffic to external destinations from the first aggregation device to the second aggregation device for delivery to the external destinations via the faster Internet connection associated with the second office;
    identifying a Flow ID of the traffic;
    transmitting traffic between the offices using the tunnel service dependent on the Flow ID;
    reordering packets to deliver the packets in order to a remote endpoint of the packets;
    wherein the first aggregation device and the second aggregation device are configured as a local aggregation device and a recipient aggregation device, configured to:
        utilize a capture all mode of communication between the local aggregation device configured as a client and the recipient aggregation device configured as a server, wherein the capture all mode routes/delivers all traffic to external destinations from the local aggregation device to the recipient aggregation device for delivery to the external destinations via the recipient aggregation device;
        route HTTP traffic via the HTTP proxy process when the local aggregation device is not utilizing the capture all mode of communication; and
        route HTTP traffic via a tunnel process when the local aggregation device is utilizing the capture all mode of communication.

2. The method of claim 1 wherein the traffic is packet based.

3. The method of claim 2 wherein the step of identifying a Flow ID is performed for each packet of the traffic.

4. The method of claim 3 wherein the Flow ID is determined by reference to a Flow Table.

5. The method of claim 4 wherein the Flow Table is implemented by using a hash table.

6. The method of claim 1 wherein the overlay network is operable when the first office and the second office utilize different types of communication technologies, without requirement for any special central office component, and wherein more than two offices can form an overlay network, with each pair of offices having a virtual single high throughput pipe available that is achieved through aggregation of Internet access services at each office.

7. The method of claim 6 further comprising performing a WAN interface processing routine associated with a packet received on a local interface by an aggregation device, the WAN interface processing routine including subroutines for:
    determining if at least one received packet belongs to a flow on at least one flow table;
    creating an entry in the flow table if the at least one received packet does not belong to a flow on the at least one flow table;
    updating a respective entry in the flow table if the at least one received packet does belong to a flow on the at least one flow table;
    examining the created or the updated entry in the flow table; and
    in response to the examination, executing a pass through subroutine, a tunnel subroutine, and/or an HTTP proxy subroutine;
    wherein the pass through subroutine comprises modifying a packet header as indicated in the flow table and forwarding the packet on a local interface, the tunnel subroutine comprises forwarding the packet to one or more tunnel process(es) identified in the flow table, and the HTTP proxy subroutine comprises forwarding the packet to an HTTP proxy process or other process identified in the flow table.

8. The method of claim 7 wherein, as a function of connection(s) created between offices associated with the aggregation devices via the pass through, the tunnel and/or the HTTP proxy subroutines, an overlay network of access links is provided that is operable when the offices utilize different types of communication technologies, and wherein more than two offices can form an overlay network, with each pair of offices having a virtual single high throughput pipe available that is achieved through aggregation of Internet access services at each office.

9. The method of claim 8 wherein the discovery protocol includes information regarding the parameters associated with the at least one aggregation device used to classify traffic.

10. The method of claim 9 further comprising configuring communications over the at least one tunnel service for storage and reordering, via a reordering buffer, of packets that arrive at a remote endpoint out of order, for delivery in proper order at the remote endpoint.

11. The method of claim 8 wherein the at least one aggregation device is attached to M access line devices, and an at least one other aggregation device is attached to N access line devices; and
    wherein the memory is further configured to determine which of the MN access lines to use, based on an algorithm in a packet data network.

12. The method of claim 1 wherein the flow table includes groups of packets with matching information in at least one of a header and/or a payload.

13. The method of claim 1 wherein the flow table includes at least one of a time stamp and/or a bit pattern.

14. A method for performing a local interface processing routine associated with a packet received on a local interface by a local aggregation device involving delivery to a recipient aggregation device, the method comprising performing subroutines for:
    determining if at least one received packet belongs to a flow on at least one flow table;
    creating an entry in the flow table if the at least one received packet does not belong to a flow on the at least one flow table;
    updating a respective entry in the flow table if the at least one received packet does belong to a flow on the at least one flow table;
    examining the created entry or the updated entry in the flow table;
    in response to the examination, executing a pass through subroutine, a tunnel subroutine, and/or an HTTP proxy subroutine, wherein the pass through subroutine comprises modifying a packet header and forwarding the packet on a marked WAN interface as indicated in the flow table, the tunnel subroutine comprises forwarding the packet to one or more tunnel process(es) identified in the flow table, and the HTTP proxy subroutine comprises forwarding the packet to an HTTP proxy process or other process identified in the flow table; and
    bonding communication resources over an access link to the recipient aggregation device at a level higher than the link layer such that terminating components at both sides of the access link are not required;
    wherein the local aggregation device is configured to:
        utilize a capture all mode of communication between the local aggregation device configured as a client and the recipient aggregation device configured as a server, wherein the capture all mode routes/delivers all traffic to external destinations from the local aggregation device to the recipient aggregation device for delivery to the external destinations via the recipient aggregation device;
        route HTTP traffic via the HTTP proxy process when the local aggregation device is not utilizing the capture all mode of communication; and
        route HTTP traffic via a tunnel process when the local aggregation device is utilizing the capture all mode of communication.

15. The method of claim 14 wherein the flow table includes groups of packets with matching information in at least one of a header and/or a payload.

16. The method of claim 14 wherein the flow table includes at least one of a time stamp and/or a bit pattern.

17. The method of claim 14 wherein, as a function of connection(s) created between offices associated with the aggregation devices via the pass through, the tunnel and/or the HTTP proxy subroutines, an overlay network of access links is provided that is operable when the offices utilize different types of communication technologies, and wherein more than two offices can form an overlay network, with each pair of offices having a virtual single high throughput pipe available that is achieved through aggregation of Internet access services at each office.

18. A system that performs a local interface processing routine associated with a packet received on a local interface by a local aggregation device involving delivery to a recipient aggregation device, the system comprising one or more processing devices and/or aggregation devices configured to perform subroutines for:
    determining if at least one received packet belongs to a flow on at least one flow table;
    creating an entry in the flow table if the at least one received packet does not belong to a flow on the at least one flow table;
    updating a respective entry in the flow table if the at least one received packet does belong to a flow on the at least one flow table;
    examining the created entry or the updated entry in the flow table;
    in response to the examination, executing a pass through subroutine, a tunnel subroutine, and/or an HTTP proxy subroutine, wherein the pass through subroutine comprises modifying a packet header and forwarding the packet on a marked WAN interface as indicated in the flow table, the tunnel subroutine comprises forwarding the packet to one or more tunnel process(es) identified in the flow table, and the HTTP proxy subroutine comprises forwarding the packet to an HTTP proxy process or other process identified in the flow table; and
    bonding communication resources over an access link to the recipient aggregation device at a level higher than the link layer such that terminating components at both sides of the access link are not required;
    wherein the local aggregation device is configured to:
        utilize a capture all mode of communication between the local aggregation device configured as a client and the recipient aggregation device configured as a server, wherein the capture all mode routes/delivers all traffic to external destinations from the local aggregation device to the recipient aggregation device for delivery to the external destinations via the recipient aggregation device;
        route HTTP traffic via the HTTP proxy process when the local aggregation device is not utilizing the capture all mode of communication; and
        route HTTP traffic via a tunnel process when the local aggregation device is utilizing the capture all mode of communication.

19. The system of claim 18 wherein the flow table includes groups of packets with matching information in at least one of a header and/or a payload.

20. The system of claim 18 wherein the flow table includes at least one of a time stamp and/or a bit pattern.

* * * * *